United States Patent
Huang et al.

(10) Patent No.: US 9,953,449 B2
(45) Date of Patent: Apr. 24, 2018

(54) CHARACTER ADJUSTMENT METHOD FOR ADJUSTING A CHARACTER DESIGNED IN A FIRST PIXEL MATRIX SO AS TO OUTPUT THE CHARACTER TO A SECOND PIXEL MATRIX OF AN OUTPUT DEVICE

(71) Applicant: ARPHIC TECHNOLOGY CO., LTD., New Taipei (TW)

(72) Inventors: Yi-Hui Huang, New Taipei (TW); Fu-Sheng Wu, New Taipei (TW); Hsueh-Chih Huang, New Taipei (TW)

(73) Assignee: ARPHIC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/298,236

(22) Filed: Oct. 20, 2016

(65) Prior Publication Data

US 2017/0278287 A1 Sep. 28, 2017

(30) Foreign Application Priority Data

Mar. 22, 2016 (TW) .............................. 105108741 A (51) Int. Cl.
| | |
|---|---|
| *G06T 11/00* | (2006.01) |
| *G06T 11/60* | (2006.01) |
| *G06T 3/40* | (2006.01) |
| *G06T 11/20* | (2006.01) |
| *G09G 1/14* | (2006.01) |
| *G09G 5/26* | (2006.01) |
| *G06K 15/02* | (2006.01) |

(52) U.S. Cl.
CPC ................ *G06T 11/60* (2013.01); *G06T 3/40* (2013.01); *G06T 11/203* (2013.01); *G06K 15/02* (2013.01); *G09G 1/14* (2013.01); *G09G 5/26* (2013.01)

(58) Field of Classification Search
CPC ............ G06K 15/02; G09G 5/26; G09G 5/24; G09G 1/14; G06T 11/203
See application file for complete search history.

(56) References Cited

U.S. PATENT DOCUMENTS

| | | | | |
|---|---|---|---|---|
| 4,284,988 A | * | 8/1981 | Seitz ........................ | G09G 5/24 345/26 |
| 4,709,274 A | * | 11/1987 | Tanioka ............. | H04N 1/40062 358/2.1 |
| 5,461,707 A | * | 10/1995 | O'Gorman ........... | H04N 1/3935 345/668 |
| 5,771,048 A | * | 6/1998 | Nankou ................ | G06T 11/001 345/471 |
| 7,643,031 B2 | * | 1/2010 | Watanabe ............. | G06T 11/203 345/467 |

(Continued)

*Primary Examiner* — Abderrahim Merouan
(74) *Attorney, Agent, or Firm* — Winston Hsu (57) ABSTRACT

A character adjustment method is used for adjusting the character so as to output the character to a second pixel matrix of an output device. The character is designed in a first pixel matrix. The method includes determining a constant, an upper density limit and a lower density limit according to at least one feature value of the output device; performing an interpolation calculation for obtaining a variation parameter according to a density of the character in the first pixel matrix, the constant, the upper density limit and the lower density limit; adjusting the character according to the variation parameter; and outputting the adjusted character to the second pixel matrix by the output device.

8 Claims, 8 Drawing Sheets

(56) References Cited

U.S. PATENT DOCUMENTS

| | | | | |
|---|---|---|---|---|
| 8,243,077 B2* | 8/2012 | Cheng | ............... | G06T 11/203 |
| | | | | 345/468 |
| 8,675,241 B2* | 3/2014 | Torikoshi | ............ | H04N 1/3873 |
| | | | | 358/1.18 |
| 8,854,375 B2* | 10/2014 | Cheng | ............... | G06T 11/203 |
| | | | | 345/467 |
| 2002/0085018 A1* | 7/2002 | Chien | ............... | G09G 5/246 |
| | | | | 345/667 |
| 2006/0119624 A1* | 6/2006 | Wendel | ............ | G06T 3/40 |
| | | | | 345/660 |
| 2006/0125829 A1* | 6/2006 | Cheng | ............... | G06T 11/203 |
| | | | | 345/467 |
| 2006/0285719 A1* | 12/2006 | Hsieh | ............... | G06K 9/00577 |
| | | | | 382/100 |
| 2009/0185226 A1* | 7/2009 | Kobayashi | ............ | G03G 21/043 |
| | | | | 358/1.18 |
| 2010/0053171 A1* | 3/2010 | Cheng | ............... | G06T 11/203 |
| | | | | 345/469 |
| 2010/0053697 A1* | 3/2010 | Kubota | ............ | H04N 1/38 |
| | | | | 358/449 |
| 2014/0240362 A1* | 8/2014 | Kurita | ............ | G09G 5/373 |
| | | | | 345/661 |

* cited by examiner

Condition (S-1)   Sf > SU    Vr = 1
―――――――――――――――――――――――――――― SU
Condition (S-3)   SL < Sf < SU   R2 = f(R1,Sf,SU,SD)
                                 Vr = g(D,DU,DL,R2)
―――――――――――――――――――――――――――― SL
Condition (S-2)   Sf < SL

FIG. 9

| | D<DL | DL<D<DU | D>DU |
|---|---|---|---|
| Sf>SU / SU | Vr = 1  r11 | Vr = 1  r12 | Vr = 1  r13 |
| SL<Sf<SU / SL | Vr = 1  r21 | R2 = f(Sf,SU,SL,R1)  Vr = g(D,R2,DU,DL)  r22 | R2 = f(Sf,SU,SL,R1)  Vr = g(DU,R2,DU,DL) = R2  r23 |
| Sf<SL | Vr = 1  r31 | Vr = g(D,R1,DU,DL)  r32 | Vr = R1  r33 |

| | $Vr = R1$ | $Vr = g(D,R1,DU,DL)$ | $Vr = 1$ |
|---|---|---|---|
| $Sf > SU$ $\Big\updownarrow$ | x13 | x12 | x11 |
| SU | $R2 = f(Sf,SU,SL,R1)$ | $R2 = f(Sf,SU,SL,R1)$ | |
| $SL < Sf < SU$ $\Big\updownarrow$ | $Vr = g(D,R2,DU,DL)$ $= R2$ | $Vr = g(D,R2,DU,DL)$ | $Vr = 1$ |
| | x23 | x22 | x21 |
| SL | $Vr = 1$ | $Vr = 1$ | $Vr = 1$ |
| $Sf < SL$ $\Big\updownarrow$ | x33 | x32 | x31 |
| | $D < DL$ | $DL > D > DU$ | $D > DU$ |
| | DL | | DU |

CHARACTER ADJUSTMENT METHOD FOR ADJUSTING A CHARACTER DESIGNED IN A FIRST PIXEL MATRIX SO AS TO OUTPUT THE CHARACTER TO A SECOND PIXEL MATRIX OF AN OUTPUT DEVICE

CROSS REFERENCE TO RELATED APPLICATION

This application claims priority to Taiwan Patent Application No. 105108741, filed Mar. 22, 2016, and incorporated herein by reference in its entirety.

BACKGROUND OF THE INVENTION

1. Field of the Invention

The present invention relates to a character adjustment method, and more particularly, a character adjustment method by adjusting a density of a character so as to output the character to an output device.

2. Description of the Prior Art

A character of a font may be used for various applications presently. For example, a character may be displayed, printed or projected. When a character is created, the character may be applied to different output devices and transformed to have different sizes, colors and/or font weights. In practice of using font characters, many problems of unexpected effect are observed. For example, when a large-sized character with more pixels is transformed to a small-sized character with fewer pixels, problems of strokes overlap and/or uneven distribution of strokes may occur. When a small sized character is transformed to a larger sized character, similar problems are also observed. The unfavorable effect of displaying, printing and/or projecting may therefore lead to inconvenience of users.

In prior art, a parameter may be used to calibrate multiple characters. For example, widths of a plurality of strokes may be shrunk with a proportion to avoid stroke overlapping. However, this procedure may calibrate a character with less number of strokes unnecessarily so that widths of strokes may become too thin to be clear.

Furthermore, in the prior art, the distribution of a plurality of characters may be looked uneven when reading an article with a large number of characters. The reason is, when outputting an article with many characters, some of the characters may have higher densities of strokes, and other characters may have lower densities of strokes. After calibrating all characters by using an identical parameter, the display effect may still be uneven. This problematic result of outputting characters often occurs in the applications at mobile devices. Hence, a solution is sought for dealing with shortcomings of the prior art in the field.

SUMMARY OF THE INVENTION

An embodiment of the present invention provides a character adjustment method. The character adjustment method may be used for adjusting a character designed in a first pixel matrix so as to output the character to a second pixel matrix of an output device. The method may include determining a first constant, an upper density limit and a lower density limit according to at least one feature value of the output device; performing an interpolation to obtain a variation parameter according to a density of the character in the first pixel matrix, the first constant, the upper density limit and the lower density limit; adjusting the character according to the variation parameter to generate an adjusted character; and outputting the adjusted character to the second pixel matrix by the output device.

An embodiment of the present invention provides character adjustment method. The character adjustment method may be used for adjusting a character designed in a first pixel matrix so as to output the character to a second pixel matrix of an output device. The method may include determining a first constant, an upper density limit, a lower density limit, an upper size limit and a lower size limit according to at least one feature value of the output device; performing a first interpolation calculation to obtain a second constant according to a size of the second pixel matrix, the first constant, the upper size limit and the lower size limit; performing a second interpolation calculation to obtain a variation parameter according to a density of the character in the first pixel matrix, the second constant, the upper density limit and the lower density limit; adjusting the character according to the variation parameter to generate an adjusted character; and outputting the adjusted character to the second pixel matrix by the output device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
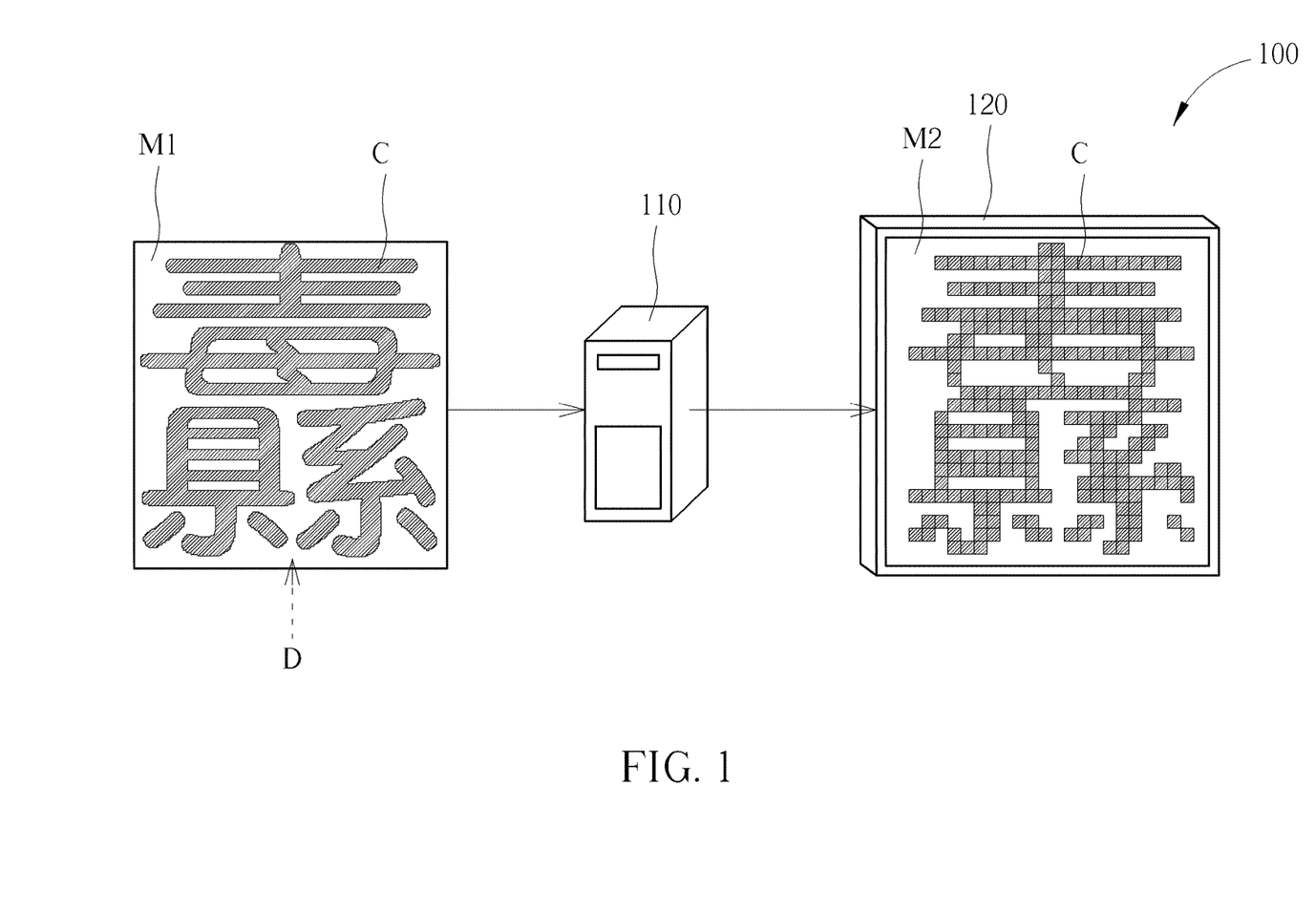
FIG. 1 illustrates a computer system provided by an embodiment of the present invention.

FIG. 1 illustrates a computer system 100 provided by an embodiment of the present invention. The computer system 100 may include a processing device 110 and an output device 120. The processing device 110 may process a character C designed at a pixel matrix M1. Then the output device 120 may output the character C to a pixel matrix M2. The processing device 110 may be a processor or a server having a font engine. The output device 120 may be a device being able to output characters such as a smart phone, a monitor, a tablet personal computer, a display panel, a printer, a projector or a digital camera. According to an embodiment of the present invention, the processing device 110 and the output device 120 may be integrated in one device, or be connected to one another via a wired or wireless path.

Figure 2:
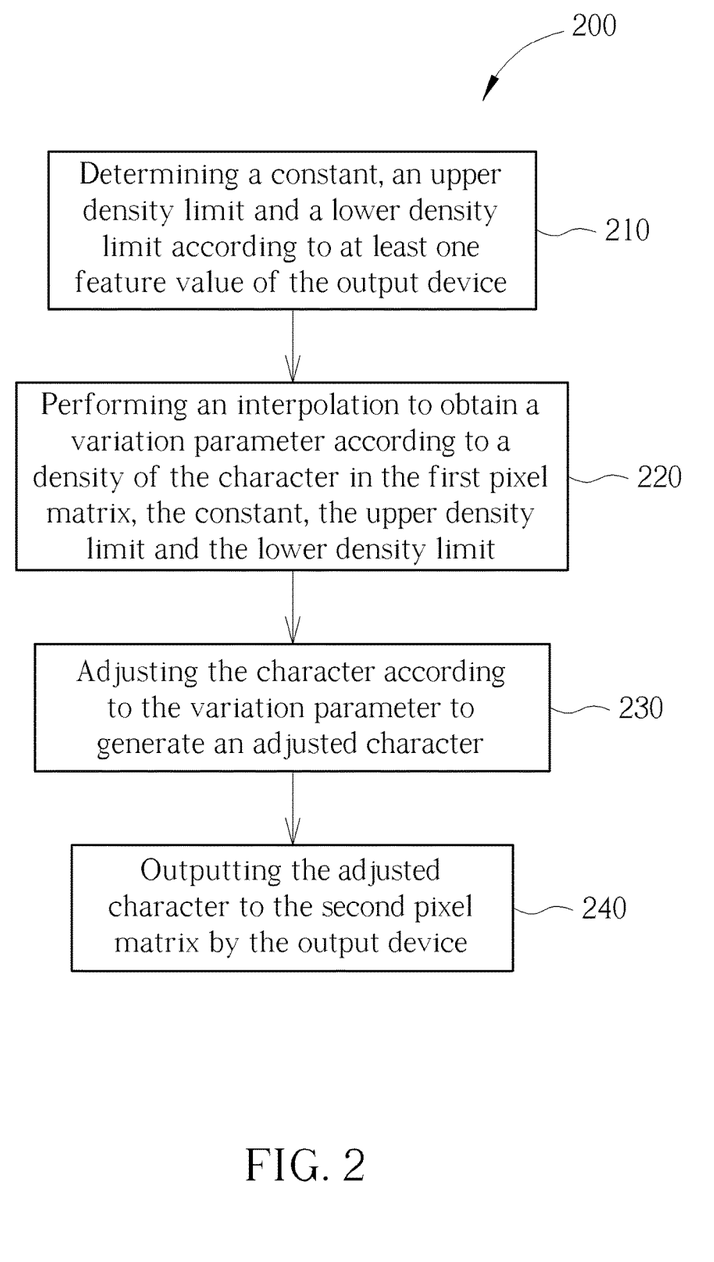
FIG. 2 illustrates a flowchart of a character adjustment method according to an embodiment of the present invention.

FIG. 2 illustrates a flowchart of a character adjustment method 200 according to an embodiment of the present invention. Referring to the computer system 100 of FIG. 1, the character adjustment method 200 may be used to adjust the character C designed at the pixel matrix M1 and output the character C to the pixel matrix M2 by the output device 120. The character adjustment 200 may include the following steps:

Step 210: determining a constant R, an upper density limit DU and a lower density limit DL according to at least one feature value of the output device 120;

Step 220: performing an interpolation to obtain a variation parameter Vr according to a density D of the character C in the pixel matrix M1, the constant R, the upper density limit DU and the lower density limit DL;

Step 230: adjusting the character C according to the variation parameter Vr to generate an adjusted character C; and Step 240: outputting the adjusted character C to the pixel matrix M2 by the output device 120.

Figure 3:
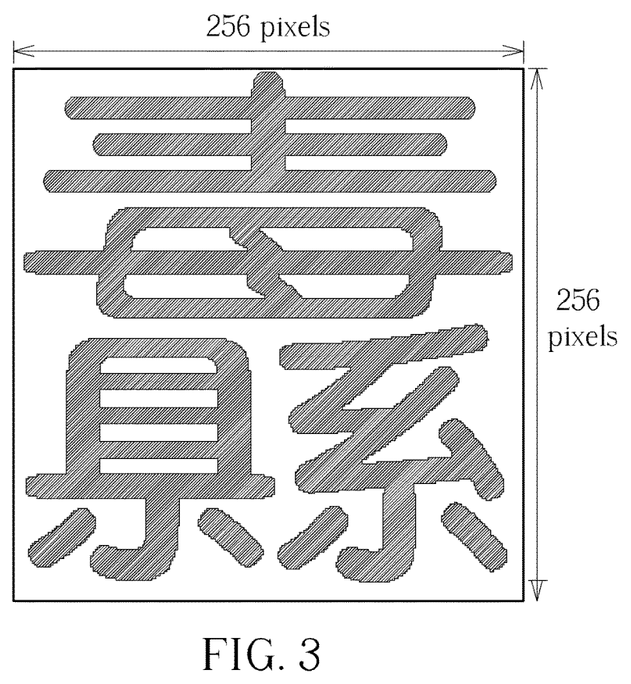
FIG. 3 illustrates that the character is output at the pixel matrix including a 26×26 pixel matrix.
Figure 4:
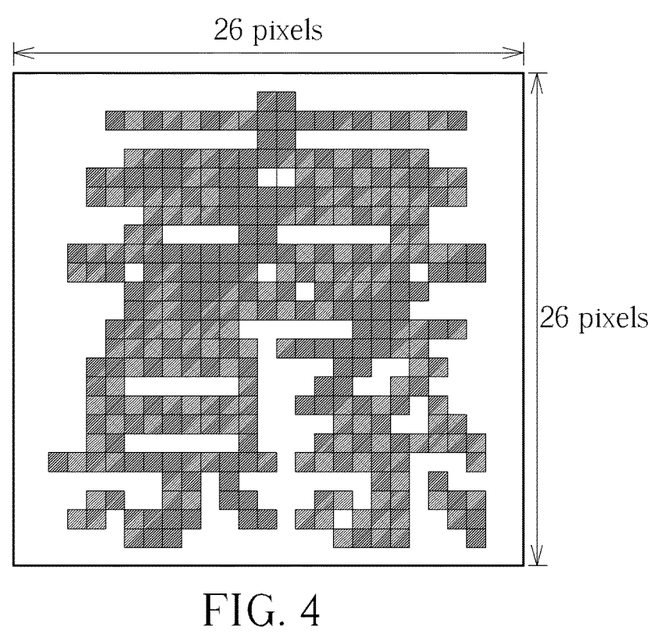
FIG. 4 illustrates that the character of FIG. 3 is shrunk to the 26×26 pixel matrix directly and proportionally.

For example, the character C may be a Chinese character "縛" (Unicode0x7E9B) designed at the pixel matrix M1, and the pixel matrix M1 may be a 256×256 pixel matrix. Hence, the pixel matrix M1 may include 65536 pixels. The pixel matrix M2 may be a 26×26 pixel matrix so as to include 676 pixels. Since the pixel matrix M1 has more pixels than the pixel matrix M2, curves of boundaries of strokes of the character C may be smoother, and spaces between the strokes may be well reserved when the character C is designed at the pixel matrix M1 originally. The character C may therefore be displayed more clearly at the pixel matrix M1. However, when shrinking the character C from the pixel matrix M1 to the pixel matrix M2, since the pixel matrix M2 includes a smaller number (676) of pixels, the boundaries of the strokes of the character C may be less smooth such as being jagged. Different strokes may be difficult to be separated well, and may overlap one another so as to deteriorate the readability. FIG. 3 illustrates that the character C is output at the pixel matrix including a 26×26 pixel matrix. The character "縛" is still used for an example. FIG. 4 illustrates that the character C of FIG. 3 is shrunk to the 26×26 pixel matrix directly and proportionally. As shown in FIG. 4, the strokes overlap one another more seriously. Hence, the 200 of FIG. 2 may be used to improve the effect of displaying.

In step 210, the at least one feature value may include a resolution, a color level setting and/or a font weight value. The resolution may be shown by using dots per inch (dpi). The color level setting may include a monochrome setting and/or a grey level setting. The font weight value may be a setting value about setting the character to be a bolt, regular or light character. The constant R, the upper density limit DU and the lower density limit DL may be shown as the following table 1:

TABLE 1

| The constant R | 0.8 |
|---|---|
| The upper density limit DU | 50% |
| The lower density limit DL | 30% |

Figure 6:
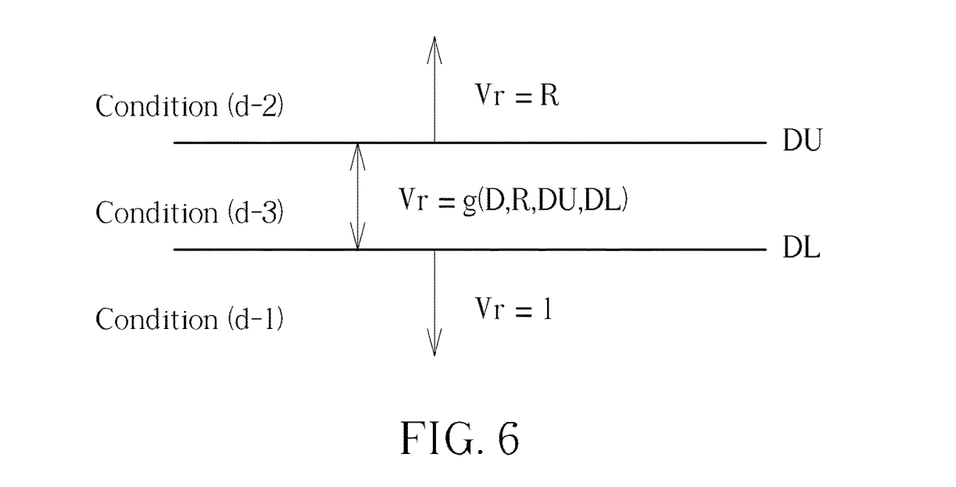
FIG. 6 illustrates three conditions by considering the density, the upper density limit, the lower density limit, the constant and the variation parameter.

The numbers in the table 1 may be examples rather than limiting the scope of the present invention. The table can be built according to statistical data from a database. A plurality of tables may be generated according to several feature values, and then a completed set of tables may be generated automatically by means of interpolation. The generated tables may be optimized artificially afterward, but the artificial optimization may not be necessary. In step 220, the density D of the character C in the pixel matrix M1 may be a ratio of the number of colored pixels to the number of all pixels of the pixel matrix M1. Taking the monochrome setting as an example, when the pixel matrix M1 includes 65536 pixels, and the character C is formed by means of 31116 colored pixels in the pixel matrix M1, the density D of the character C may be 31116/65536, that is 47.4%. FIG. 6 illustrates a diagram of relations among the density D, the upper density limit DU and the lower density limit DL according to an embodiment of the present invention. For example, when the pixel matrix M1 is larger than the pixel matrix M2 in other words, when the pixel matrix M1 has more pixels than the pixel matrix M2 the following three conditions may occur by considering the mentioned density D, the upper density limit DU, the lower density limit DL, the constant R and the variation parameter Vr.

Condition (d-1): When the density D is lower than the lower density limit DL, the strokes of the character C may be arranged with more space among the strokes. Hence, the character C may be expected to be clear when being output to the pixel matrix M2 after being shrunk proportionally and directly.

Condition (d-2): When the density D is higher than the lower density limit DL, the structure of the strokes of the character C may be quite complicate. The character C at the pixel matrix M1 may be shrunk proportionally according to the ratio of the matrix M1 to the matrix M2 and then the character C may be processed by using a minimum value of the variation parameter Vr, that is the constant R.

Condition (d-3): When the density D is between the upper density limit DU and the lower density limit DL, the variation parameter Vr may be obtained by performing an interpolation according to the density D, the constant R, the upper density limit DU and the lower density limit DL.

FIG. 6 illustrates the conditions (d-1) to (d-3) mentioned above. Here a function g (D, R, DU, DL) is to represent the interpolation. For example, the interpolation may be performed with (but not limited to) the following equation (c1):

$$Vr = g(D, R, DU, DL) \quad \quad (c1)$$
$$= 1 - (D - DL)/(DU - DL) \times (1 - R).$$

Figure 5:
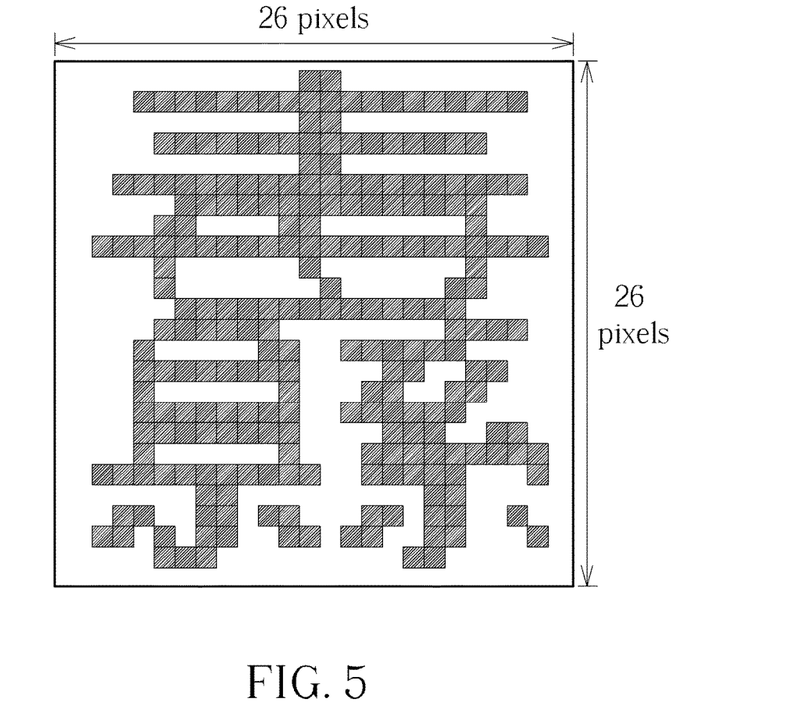
FIG. 5 illustrates that the adjusted character generated by adjusted the character of FIG. 4 according to the variation parameter is output to the pixel matrix.

In step 230, the character C may be adjusted according to the variation parameter Vr. For example, if the variation parameter Vr is calculated to be 0.9, the character C output to the pixel matrix M2 may be shrunk proportionally (as shown in FIG. 4), and be adjusted according to the variation parameter Vr (e.g. 0.9) to be shown as FIG. 5. FIG. 5 illustrates that the adjusted character C generated by adjusted the character C of FIG. 4 according to the variation parameter Vr is output to the pixel matrix M2. Comparing with the character C shown in FIG. 4, the character C shown in FIG. 5 may be clearer and have better readability. For example, the adjustment according to the variation parameter Vr (e.g. 0.9) may be shrinking the thicknesses of the strokes of the character C to a percentage (e.g. 90%) corresponding to the variation parameter Vr. According to embodiments of the present invention, adjusting the character C according to the variation parameter Vr may include changing thickness of at least one stroke of the character C according to the variation parameter Vr, changing at least a width of an outline of the character according to the variation parameter Vr, and/or changing a gamma value of the character C according to the variation parameter Vr. Adjusting the strokes or the outline to be thinner may enlarge interval spaces among the strokes so that the adjusted character C may be clearer. Reducing the gamma value of the character C may make the displayed character to be less dark so as to achieve a more balanced visual effect. In step 240, the output adjusted character C may be as shown in FIG. 5. Comparing with FIG. 4, the strokes of the adjusted character C shown in FIG. 5 are better separated so as to be clearer.

Figure 7:
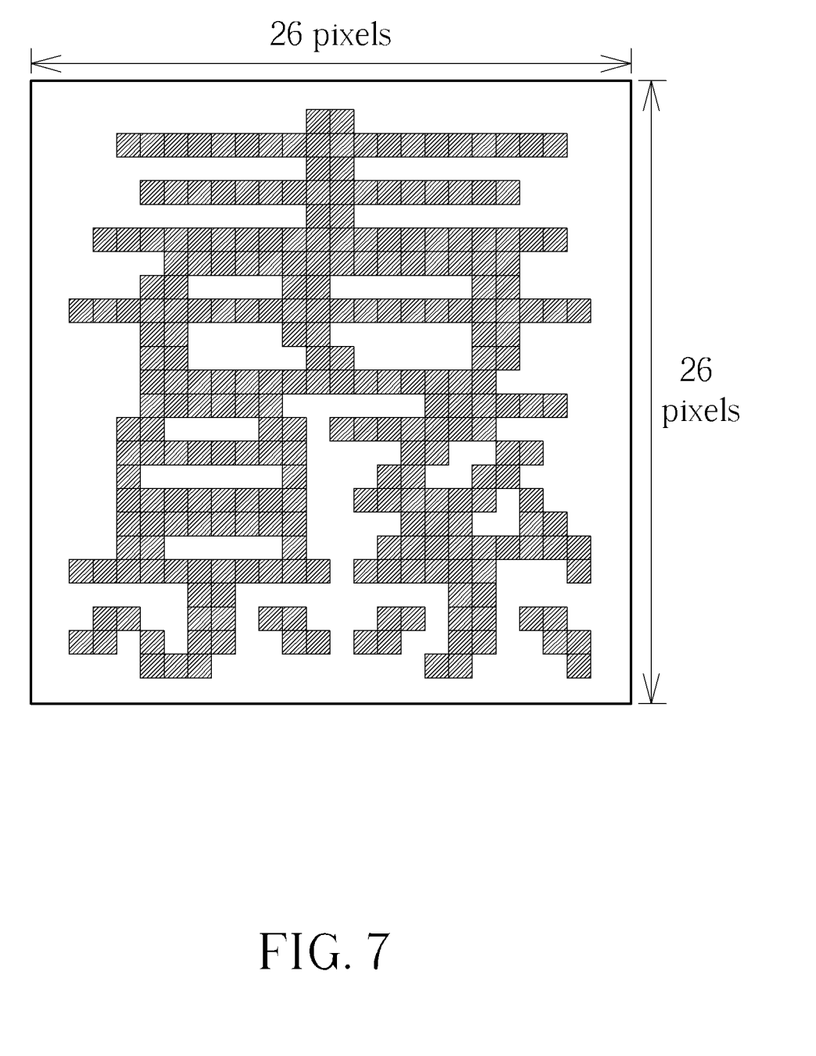
FIG. 7 illustrates an adjusted character generated by adjusting the character of FIG. 4 and output to a pixel matrix according to an embodiment of the present invention.

FIG. 7 illustrates an adjusted character generated by adjusting the character of FIG. 4 and output to a pixel matrix according to an embodiment of the present invention. Since a Chinese character usually includes more horizontal strokes and fewer vertical strokes, another possible way to adjust a character may be merely reducing the thicknesses of the horizontal strokes rather than reducing the thicknesses of the vertical strokes; or reducing the thicknesses of the horizontal strokes by a larger ratio than a ratio used for reducing the thicknesses of the vertical strokes. The aesthetic value of the character C may be better preserved after being adjusted in this way. In FIG. 7, the adjusted character C is generated by reducing the thicknesses of the horizontal strokes and keeping the thicknesses of the vertical strokes. The visual effect of FIG. 7 is different from that of FIG. 5, and the adjusted character C in FIG. 7 is still with better clearness and readability by comparing with the character C in FIG. 4.

Figure 8:
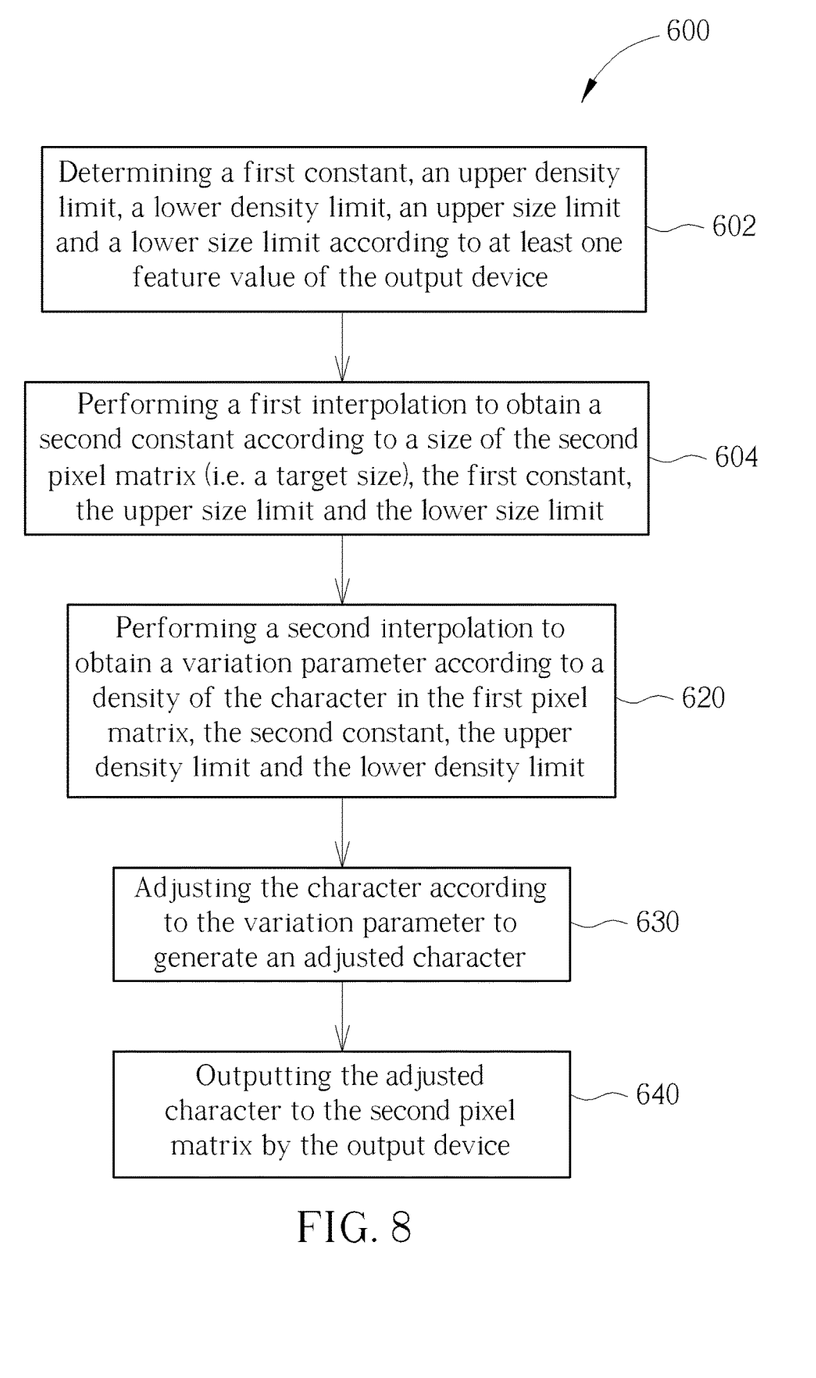
FIG. 8 illustrates a flowchart of a character adjustment method according to an embodiment of the present invention.

FIG. 8 illustrates a flowchart of a character adjustment method 600 according to an embodiment of the present invention. By referring to the computer system 100 of FIG. 1, the character adjustment method 600 may be used to adjust the character C and output the adjusted character C to the pixel matrix M2 of the output device 120. The character C is designed in the pixel matrix M1. The character adjustment method 600 may include the following steps:

Step 602: determining a first constant R1, an upper density limit DU, a lower density limit DL, an upper size limit SU and a lower size limit SL according to at least one feature value of the output device 120;

Step 604: performing a first interpolation to obtain a second constant R2 according to a size of the pixel matrix M2 (i.e. a target size), the first constant R1, the upper size limit SU and the lower size limit SL;

Step 620: performing a second interpolation to obtain a variation parameter Vr according to a density D of the character C in the pixel matrix M1, the second constant R2, the upper density limit DU and the lower density limit DL;

Step 630: adjusting the character C according to the variation parameter Vr to generate an adjusted character C; and Step 640: outputting the adjusted character C to the pixel matrix M2 by the output device 120.

Comparing with the 200 of FIG. 2, the character adjust method 600 further refers to the size of the pixel matrix M2 that is the target size Sf. Here in this document the mentioned size is corresponding to the number of pixels rather than dimensions of a monitor or a display. For example, when a first matrix of 64 pixels×64 pixels is projected as a square of 4 meters×4 meters, the size of the first matrix is still considered to be smaller than a size of a second matrix of 256 pixels×256 pixels output to a sheet of paper of A4 size (297 mm.×210 mm). For example, in step 602, the first constant R1, the upper density limit DU, the lower density limit DL, the upper size limit SU and the lower size limit SL may be shown as the following table 2 according to at least one feature value (e.g. a resolution, a color level setting and/or a font weight value).

TABLE 2

| The first constant R1 | 0.8 |
| The upper density limit DU, | 50% |
| The lower density limit DL, | 30% |
| The upper size limit SU | 128 (pixels) |
| The lower size limit SL | 40 (pixels) |

Figure 9:
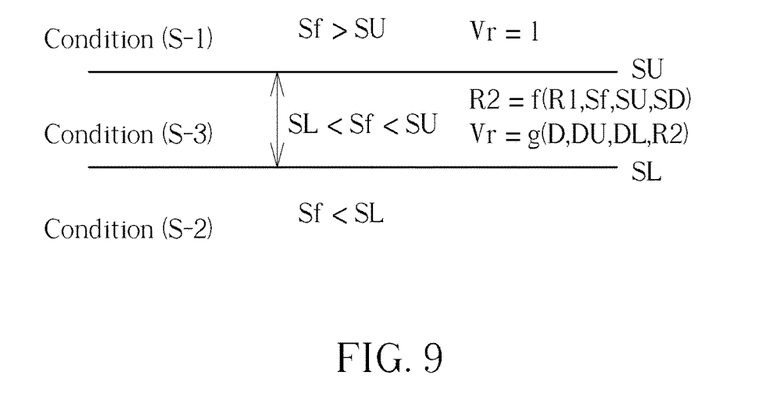
FIG. 9 illustrates three conditions by considering the target size, the upper size limit and the lower size limit according to an embodiment of the present invention.

The table 2 is merely used as an example, and data of the table 2 are not used to limit the scope of the present invention. The upper size limit SU of 128 pixels (which may be described as SU=128) is corresponding to a pixel matrix of 128 pixels×128 pixels. The lower size limit SL of 40 pixels (which may be described as SL=40) is corresponding to a pixel matrix of 40 pixels×40 pixels. In an example of that the pixel matrix M1 is larger than the pixel matrix M2 three possible conditions may occur by considering the target size Sf, the upper size limit SU and the lower size limit SL according to an embodiment of the present invention. FIG. 9 illustrates the following three conditions.

Condition (s-1): When the target size Sf is larger than the upper size limit SU, the number of pixels of the pixel matrix M2 may be large enough, so the character may be displayed clearly if shrinking the character proportionally and directly. The variation parameter may be 1 under this condition.

Condition (s-2): When the target size Sf is smaller than the lower size limit SL, the number of pixels of the pixel matrix M2 may be quite small. The display effect of displaying the adjusted character C may depend on the density D. Hence, the variation parameter may be calculated according to the density D. The smaller the density D is, the simpler the structure of the character C is so that the display effect may be clearer. On the contrary, the larger the density is, the more unclear the display effect may be.

Condition (s-3): When the target size Sf is between the upper size limit SU and the lower size limit SL, the second constant R2 may be obtained by performing the first interpolation described in step 604. The first interpolation may be described as a function f( ) here, so a function equation R2=f(R1, Sf, SU, SD) may be performed. The first interpolation may be described as (but not limited to) the following equation (c2).

$$R2 = f(Sf, SU, SL, R1) \qquad (c2)$$
$$= 1 - (Sf - SL)/(SU - SL) \times (1 - R1).$$

For example, when the pixel matrix M2 is a matrix of 64 pixels×64 pixels, the target size Sf may be 64. When using data from the table 2 to perform the equation (c2), the second constant R2 may be obtained as below.

$$R2 = f(Sf, SU, SL, R1)$$
$$= 1 - (Sf - SL)/(SU - SL) \times (1 - R1)$$
$$= 1 - (64 - 40)/(128 - 40) \times (1 - 0.8)$$
$$= 0.9$$

As described above, the first constant R1 may be a minimum of the variation parameter Vr, that is the variation parameter used to adjust the character C to a greatest degree. According to an embodiment of FIG. 8, the first constant R1 may be calibrated to obtain the second constant R2 according to the target size Sf. In steps 620 to 640, the operations may be similar to the operations of steps 220 to 240, so related details are not described repeatedly. However, in the step 620, the variation parameter Vr may be calculated by using the second constant R2 obtained in the step 604. Hence, the second interpolation of the step 620 may be (but not limited to) the following equation (c3):

$$Vr = g(D, R2, DU, DL) \qquad (c3)$$
$$= 1 - (D - DL)/(DU - DL) \times (1 - R2).$$

The function g of the equation (c3) may be the function g used in the above equation (c1). However, in the equation (c3), the constant R used in the equation (c1) may be replaced with the second constant R2.

Figure 10:
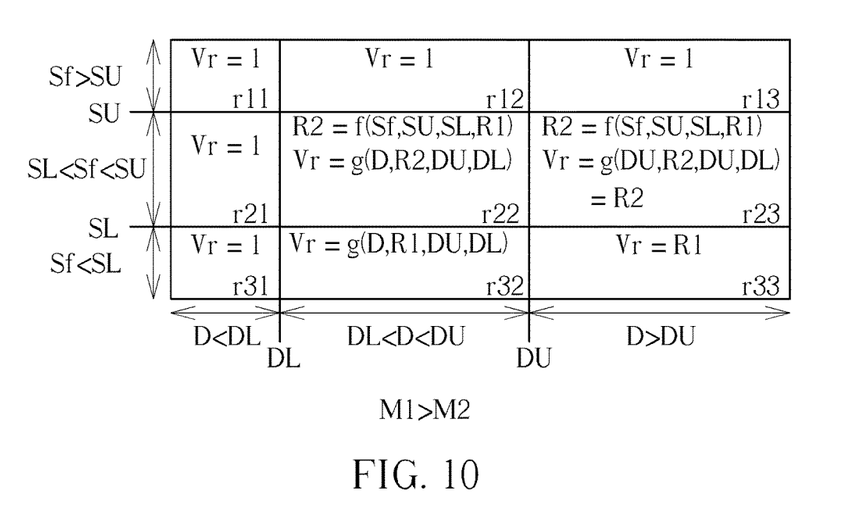
FIG. 10 illustrates a coordinate related to a plan of calculating the variation parameter with considering the density of the character and the target size according to an embodiment of the present invention.

FIG. 10 illustrates a coordinate related to a plan of calculating the variation parameter Vr with considering the density of the character and the target size Sf according to an embodiment of the present invention. FIG. 10 is merely an example, and a user may adjust the calculating method or rules according to requirement. In FIG. 10, the vertical axis may be separated into three regions by comparing the target size Sf with the upper size limit SU and the lower size limit SL. The horizontal axis may be separated into three regions by comparing the density D with the upper density limit DU and the lower density limit DL. In FIG. 10, the boundary condition is not discussed here, and a user may select a calculating method or a rule of an adjacent region under the boundary condition according to the requirement. FIG. 10 is corresponding to an embodiment in which the pixel matrix M1 is larger than the pixel matrix M2. In FIG. 10, nine regions r11 to r33 are shown. In the regions r11, r12 and r13, the target size Sf is large enough, so the pixel matrix M2 may include enough pixels, and the display effect may be clear enough. Hence, the strokes or outlines of the character C may be kept without being adjusted thinner so that the variation parameter Vr may be 1. The character C may be adjusted proportionally from the pixel matrix M1 to the pixel matrix M2 without additional adjustment such as thinning the strokes, and then the adjusted character C may be output. Regarding the regions r11, r12 and r13, the density D is smaller than the lower density limit DL, so the character C may be simple enough, and the variation parameter Vr may be 1 such as the condition (d-1) described above. The character C may be adjusted proportionally from the pixel matrix M1 to the pixel matrix M2 and output without additional adjustment. Regarding the region r22, the equations (c2) and (c3) may be used to obtain the second constant R2 so as to obtain the variation parameter Vr accordingly. Regarding the region r32, since the target size Sf has been smaller than the lower size limit SL, the target size Sf may be not considered, and the variation parameter Vr may be calculated by using the density D, the first constant R1, the upper density limit DU and the lower density limit DL. Regarding the region r23, the second constant R2 may be obtained by using the function f according to the target size Sf first, and the variation parameter Vr may be calculated by using the function g. Since the density D has been higher than the upper density limit DU under the condition of the region r23, the density D used in the function g may be replaced with the upper density limit DU, and the variation parameter Vr may be calculated to be the second constant R2. Regarding the region r 33, since the density D has been larger than the upper density limit DU, and the target size Sf has been smaller than the lower size limit SL, a minimum of the variation parameter Vr, that is the first constant R1, may be used to adjust the character C, and the character C may be adjusted to a greatest degree under the condition of the region r33.

Figure 11:
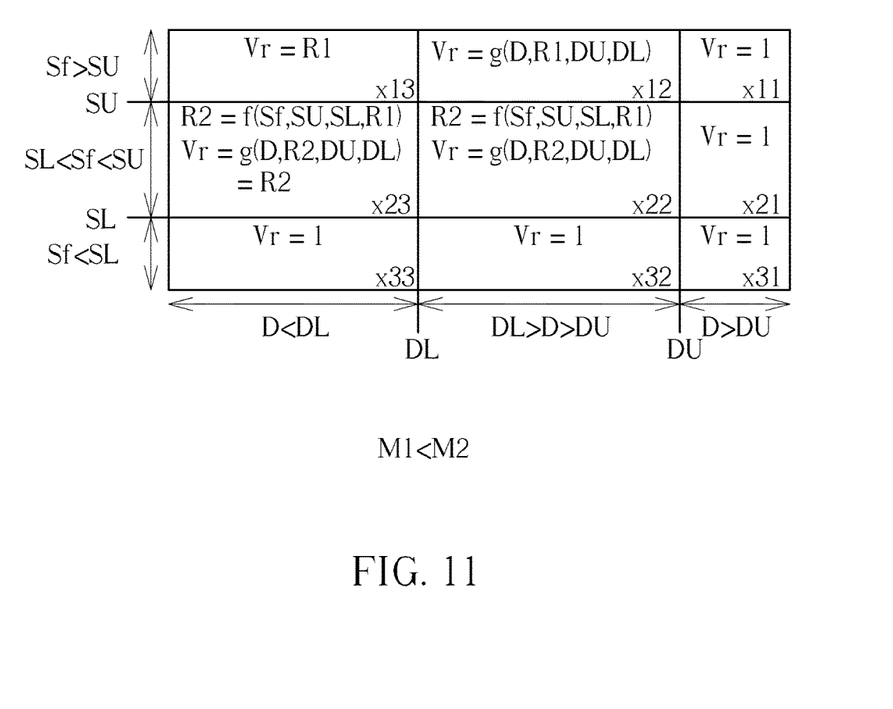
FIG. 11 illustrates a coordinate related to a plan of calculating the variation parameter with considering the density of the character and the target size according to an embodiment of the present invention.

FIG. 11 illustrates a coordinate related to a plan of calculating the variation parameter Vr with considering the density of the character and the target size Sf according to an embodiment of the present invention. In FIG. 11, the pixel matrix M1 may be smaller than the pixel matrix M2, so the application corresponding to FIG. 11 may be opposite to the application of FIG. 10, and the plan provided by FIG. 11 may also be symmetrical with the plan of FIG. 10. For example, the region x11 may be corresponding to the region r11, the region x12 may be corresponding to the region r12, and so on. The region x33 may be corresponding to the region r33. When the character C is enlarged with a proportion of the pixel matrix M1 to the pixel matrix M2 the character C may be adjusted by using the variation parameter Vr, and the adjusted character C may has a more balanced structure and readability when being output.

According to embodiments of the present invention, the character may be a complete character or a character radical. Taking a Chinese character "變" (Unicode 0x8B8A) as an example, the upper portion "䜌" of the character "變" has a more complex structure than the lower portion "夂", so the method of FIG. 2 or FIG. 8 according to an embodiment of the present invention may be applied to adjust the upper portion "䜌", and the lower portion "夂" may be kept without being adjusted. In a complete character, each portion of radical may be defined by being surrounded with a bonding box.

In summary, according to embodiments of the present invention, the density D of the character C designed at the pixel matrix M1 may be considered, and the target size Sf may be optionally considered, so as to obtain the variation parameter Vr. The character C may be shrunk or enlarged according to the proportion of the pixel matrix M1 to the pixel matrix M2 and be further adjusted according to the variation parameter Vr. The quality of outputting the character C to the pixel matrix M2 of the display device 120 may be improved. For example, when reading a plurality of characters on a smart phone without applying the present invention, the characters may seem unevenly distributed because the characters with more complicated structures may look denser, and strokes of those complicated characters may even overlap seriously. The readability may therefore be decreased. Characters may be adjusted so that the problem of stroke overlapping and uneven distribution of the displayed characters may be avoided. When the output device 120 is a printer in another example, the quality of the printed document may often decrease when printing complicated characters and/or bold characters for similar reason, and the risk of printing unclearly may be reduced according an embodiment of the present invention. According to an embodiment of the present invention, each character may be adjusted with a specific parameter rather than adjusting all characters by an identical degree, so that quality of output may improve. Moreover, some characters may be determined to be not adjusted or adjusted to a lower degree, so the computational resources may be saved. Hence, the quality of the characters output on the hardware device and user experience may be improved according to embodiments of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A character adjustment method for adjusting a character designed in a first pixel matrix so as to output the character to a second pixel matrix of an output device, the method comprising:
    determining a first value, an upper density limit, a lower density limit, an upper size limit and a lower size limit according to at least one feature value of the output device wherein the at least one feature value comprises a resolution, a color level setting and/or a font weight value, and the first value is not equal to one;
    performing a first interpolation to obtain a second value according to a size of the second pixel matrix, the first value, the upper size limit and the lower size limit wherein the second value is not equal to one;
    performing a second interpolation to obtain a variation parameter according to a density of the character in the first pixel matrix, the second value, the upper density limit and the lower density limit;
    adjusting the character according to the variation parameter to generate an adjusted character wherein a greater variation parameter corresponds to a smaller adjustment of the character; and
    outputting the adjusted character to the second pixel matrix by the output device.

2. The method of claim 1, wherein the output device is a smart phone, a monitor, a tablet personal computer, a display panel, a printer, a projector or a digital camera.

3. The method of claim 1, wherein the first pixel matrix is larger than the second pixel matrix.

4. The method of claim 1, wherein the first pixel matrix is smaller than the second pixel matrix.

5. The method of claim 1, wherein the character is a complete character or a character radical.

6. The method of claim 1, wherein adjusting the character according to the variation parameter comprises:
    changing thickness of at least one stroke of the character according to the variation parameter.

7. The method of claim 1, wherein adjusting the character according to the variation parameter comprises:
    changing at least a width of an outline of the character according to the variation parameter.

8. The method of claim 1, wherein adjusting the character according to the variation parameter comprises:
    changing a gamma value of the character according to the variation parameter.

* * * * *